June 24, 1947.   J. D. LUCERO   2,423,035
FRUIT JUICE CONCENTRATOR
Filed Jan. 14, 1946   2 Sheets-Sheet 1

INVENTOR.
Juan Draghi Lucero
BY Victor J. Evans & Co.
ATTORNEYS

June 24, 1947.    J. D. LUCERO    2,423,035
FRUIT JUICE CONCENTRATOR
Filed Jan. 14, 1946    2 Sheets-Sheet 2
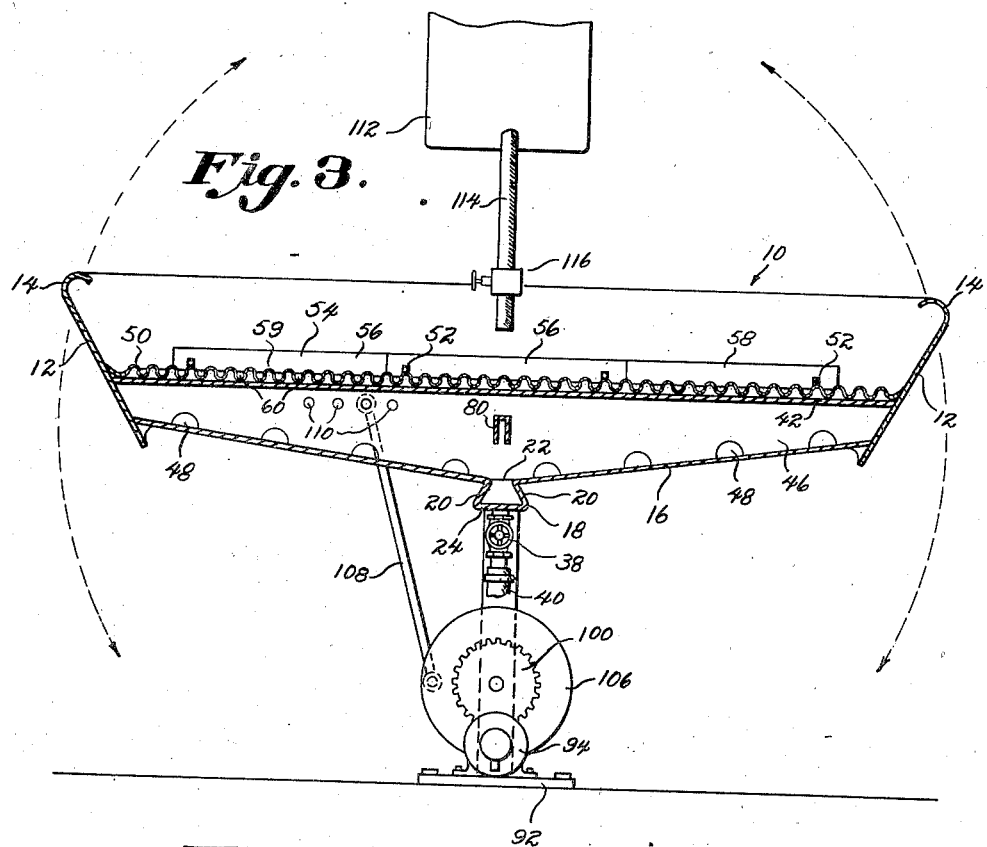
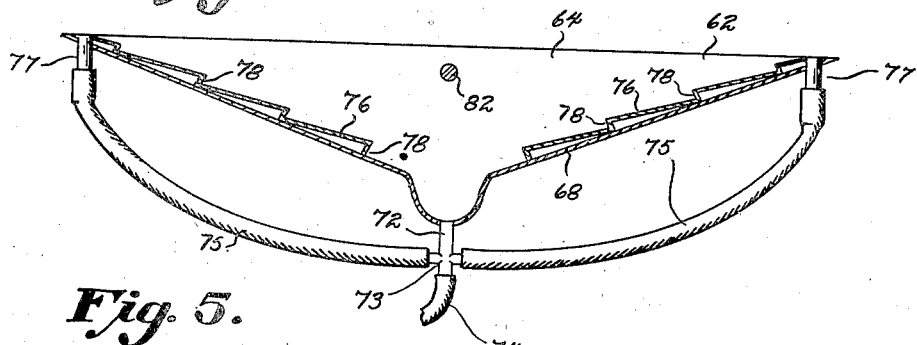
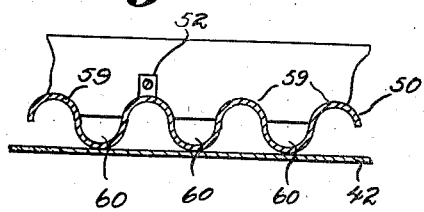
INVENTOR.
Juan Draghi Lucero
BY Victor J. Evans & Co.
ATTORNEYS Patented June 24, 1947

2,423,035

UNITED STATES PATENT OFFICE 2,423,035

FRUIT JUICE CONCENTRATOR

Juan Draghi Lucero, Mendoza, Argentina

Application January 14, 1946, Serial No. 641,142

2 Claims. (Cl. 159—37)

This invention relates to an apparatus for concentrating fruit juices or fruit pulp particularly grape juice or grape pulp. An object of the invention is to provide an apparatus incorporating steam treatment for the concentration of the fruit juices or pulp.

Another object of the invention is to provide an apparatus that will thoroughly agitate the juices so that it will be thoroughly steam treated.

With the above and other objects and advantages in view the invention consists of the novel details of construction, arrangement and combination of parts more fully hereinafter described, claimed and illustrated in the accompanying drawings in which:

Figure 3 is a sectional view on the line 3—3 of Figure 2.

Figure 4 is a sectional view on the line 4—4 of Figure 1 and

Figure 5 is a fragmentary detailed view of one of the baffle plates.

Figure 1:
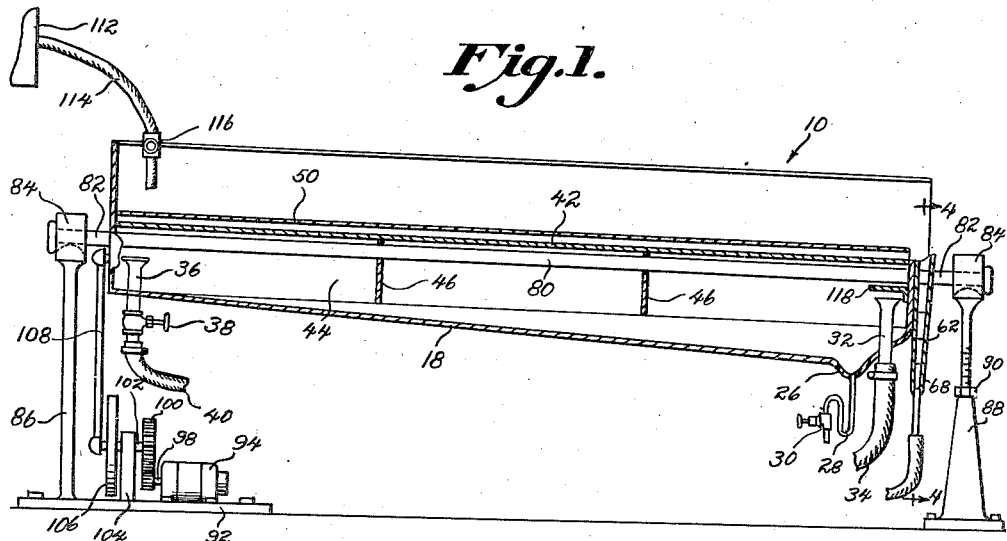
Figure 1 is a sectional view on the line 1—1 of Figure 2 of an embodiment of the invention.
Figure 2:
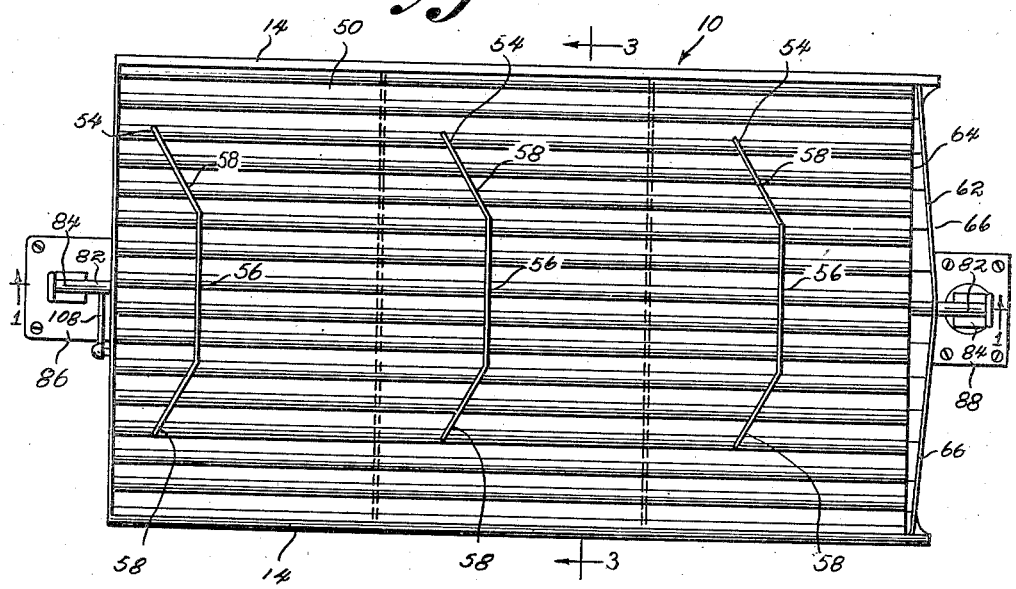
Figure 2 is a top plan view thereof.

Referring more in detail to the drawings, reference numeral 10 designates the pan or body of the apparatus having the inclined sides 12, marginal inturned rim, 14, and the downwardly and inwardly inclined bottom 16; which at the center thereof is provided with the inclined trough 18 having outwardly inclined sides 20 to form a narrow mouth 22 and a bottom 24 of greater dimension than the mouth.

Near the lower end of the trough 18 there is provided a trap 26 having a discharge pipe 28 connected thereto which is controlled by the valve 30.

The body 10 near its lower end is provided with a steam inlet 32 having a flexible pipe connection 34 and adjacent its upper end is a steam outlet 36 which is controlled by a valve 38 and is also provided with a flexible pipe connection 40.

A horizontal partition 42 adjacent the bottom of the body 10 forms a steam chamber 44 in the lower part of the body. The relatively spaced baffles 46 are secured to the body in the steam chamber 44 and contact the body and partition on all four sides. The baffles 46 are provided with relatively spaced semicircular openings 48 along the bottom edge thereof to permit condensation to drain from the trough 18 to the trap 26 from where it is discharged by means of the pipe 28.

Secured to the partition 42 on the upper surface thereof is a longitudinally extending corrugated bed plate 50 to which is secured by couplings 52 relatively spaced baffles 54 and as shown the baffles 54 lie centrally of the baffles 46 but are separated therefrom by the partition 42 and plate 52.

The baffles 54 have the straight center portions 56 and the rearwardly inclined portions 58 and the bottom edges of the baffles 54 are scolloped at 59 to conform to the bed plate 52, but the edge of the baffles are spaced from the bottom of the corrugation to form passages 60.

Adjacent the lower end of the body there is provided a discharge trough 62 which is separated from the body of the end 64 thereof. The sides 66 of the trough 62 incline outwardly toward the center of the body 10 and the bottom 68 inclines downwardly toward the trap 70 which is provided with the outlet pipe 72 leaving the flexible pipe connection 74. The outlet pipe 72 is provided with a T coupling 73 to which are connected flexibly pipe 75 which are connected to outlets 77 at the upper edges of the trough 62.

The bottom of the trough 62 is provided with inclined stepped baffles 76, the forward ends 78 of which extend at right angle to the bottom of the trough 62.

The body 10 is provided with the channel shaped axis supporting member 80 having the shafts 82 welded thereto at the ends thereof and the shafts are journalled in bearings 84 formed at the top of the supports 86 and 88 respectively. Support 86 is fixed as to height but support 88 is provided with an adjusting nut 90 whereby the inclination of the body may be varied as desired.

Support 86 is provided with a base 92 on which is mounted a motor 94 having a gear 96 on the shaft 98 thereof which meshes with a larger gear 100 on the shaft 102 journalled in the bearing support 104 fixed to the base 92. Fixed on the shaft 102 outwardly of the support 104 is the eccentric wheel 106 having the piston rod 108 connected thereto at the lower end thereof, and the upper end of the rod 108 is adapted to be received in openings 110 to vary the oscillating action of the body 10.

When the apparatus is to be used, a supply tank 112, to which is connected a flexible discharge pipe 114 controlled by a valve 116, permits the fruit juice or pulp to be discharged into the body on to the plate 50. Steam is permitted to enter the chamber 44 by means of the inlet 32 and the steam impinging on the baffle 118 adjacent the mouth of the inlet 32 is diffused over the bottom surface of the partition 42 to heat the juices on the plate 50.

The body 10 is rocked back and forth by means of the wheel 106 and rod 108 to thoroughly circulate the juices to permit the heat to contact and thoroughly permeate the juices. The inturned rim 14 prevents the juices from splashing out of the body and the baffles 54 hinder to some extent the downward flow of the juices to the discharge trough 62. The inclination of the body can be adjusted by the nut 90 to vary the speed of descent of the juices.

When the juices reach the trough 62, the shape of the baffles 76 also prevent the juices from splashing out of the trough 62, and outlets 77 prevent the juices from accumulating at the upper edges of the trough 62.

The steam outlet is controlled to permit the heat to be kept constant and any condensation is drained from the chamber 44 by means of the pipe 28.

Thus an apparatus has been provided that will thoroughly concentrate fruit juices by agitation and steam treatment.

It is believed that the operation of the apparatus will be apparent to those skilled in the art and it is to be understood that changes may be made in the details of construction, arrangement and combination of parts provided they fall within the spirit of the invention and the scope of the appended claims.

Having thus described the invention what is claimed as new and desired to be secured by Letters Patent is:

1. An apparatus of the type described, comprising a body, means for agitating the body, a steam chamber in said body, outlet and inlet means for said chamber, a discharge trough and outlet for said body, a corrugated plate in said body to receive a liquid thereon to be concentrated by the action of steam thereon, and stepped baffle plates on the bottom of said body.

2. The invention as in claim 1 wherein said chamber is provided with a transverse baffle plate having semi-circular openings along the lower marginal edge thereof, transverse baffles are provided on said corrugated plate, means is provided for securing said baffles to said plate, and means is provided for adjusting the inclination of said body.

JUAN DRAGHI LUCERO.

REFERENCES CITED

The following references are of record in the file of this patent:

UNITED STATES PATENTS

| Number | Name | Date |
|---|---|---|
| 186,646 | Watson | Jan. 23, 1877 |
| 284,123 | Ewins | Aug. 28, 1883 |
| 721,275 | Barger | Feb. 24, 1903 |
| 976,893 | Matter | Nov. 29, 1910 |
| 662,976 | Scard | Dec. 4, 1900 |